United States Patent
Liang et al.

(10) Patent No.: US 10,261,724 B2
(45) Date of Patent: Apr. 16, 2019

(54) METHOD AND APPARATUS FOR ACQUIRING DATA IN A ROBOT OPERATING SYSTEM

(71) Applicant: BEIJING BAIDU NETCOM SCIENCE AND TECHNOLOGY CO., LTD., Beijing (CN)

(72) Inventors: Yibing Liang, Beijing (CN); Kaiwen Feng, Beijing (CN); Bocong Liu, Beijing (CN); Zhuo Chen, Beijing (CN); Yu Ma, Beijing (CN); Wei He, Beijing (CN)

(73) Assignee: BEIJING BAIDU NETCOM SCIENCE AND TECHNOLOGY CO., LTD, Beijing (CN)

( * ) Notice: Subject to any disclaimer, the term of this patent is extended or adjusted under 35 U.S.C. 154(b) by 198 days.

(21) Appl. No.: 15/411,604

(22) Filed: Jan. 20, 2017

(65) Prior Publication Data
US 2018/0074756 A1    Mar. 15, 2018

(30) Foreign Application Priority Data
Sep. 12, 2016 (CN) .......................... 2016 1 0816419

(51) Int. Cl.
| | | |
|---|---|---|
| *G06F 3/00* | (2006.01) | |
| *G06F 3/06* | (2006.01) | |
| *G05B 19/408* | (2006.01) | |
| *B60W 30/00* | (2006.01) | |
| *G01S 7/00* | (2006.01) | |
| *G01S 13/93* | (2006.01) | |

(52) U.S. Cl.
CPC .......... *G06F 3/0659* (2013.01); *B60W 30/00* (2013.01); *G05B 19/408* (2013.01); *G06F 3/0604* (2013.01); *G06F 3/067* (2013.01); *G06F 3/0653* (2013.01); *G06F 3/0656* (2013.01); *G01S 7/003* (2013.01); *G01S 13/931* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,463,513 B1* | 10/2002 | Bish | ..................... | G06F 12/0866 707/999.01 |
| 7,043,356 B2* | 5/2006 | Linn | ..................... | G01C 21/36 701/411 |
| 7,756,617 B1* | 7/2010 | Cluff | ..................... | G07C 5/0858 340/476 |

(Continued)

FOREIGN PATENT DOCUMENTS

CN    105741595 A    7/2016

*Primary Examiner* — Jonathan L Sample
(74) *Attorney, Agent, or Firm* — Seed IP Law Group LLP

(57) ABSTRACT

This disclosures discloses a method and apparatus for acquiring data in a robot operating system. A specific implementation of the method includes: monitoring in real time a data storage area of an information acquirer, the information acquirer configured to acquire location state data of a driverless vehicle; obtaining updated data if the updated data are present in the data storage area; and storing the updated data into a data buffer corresponding to the information acquirer. The implementation improves the robustness of the data.

9 Claims, 5 Drawing Sheets

(56) References Cited

U.S. PATENT DOCUMENTS

| | | | | |
|---|---|---|---|---|
| 7,764,231 B1* | 7/2010 | Karr | G01S 1/026 342/457 |
| 9,046,373 B2* | 6/2015 | Bandyopadhyay | G01C 17/38 |
| 9,373,149 B2* | 6/2016 | Abhyanker | G06Q 50/28 |
| 9,720,987 B2* | 8/2017 | Bonalle | G06Q 30/02 |
| 9,805,601 B1* | 10/2017 | Fields | G08G 1/096791 |
| 10,037,689 B2* | 7/2018 | Taylor | G08G 1/0141 |
| 2002/0183043 A1* | 12/2002 | Helle | H04L 29/06 455/412.1 |
| 2002/0198632 A1* | 12/2002 | Breed | B60N 2/2863 701/1 |
| 2006/0022842 A1* | 2/2006 | Zoladek | G07C 5/008 340/870.07 |
| 2006/0025897 A1* | 2/2006 | Shostak | B60C 23/005 701/1 |
| 2008/0215202 A1* | 9/2008 | Breed | G01C 21/3611 701/25 |
| 2010/0023206 A1* | 1/2010 | Paquette | H04L 67/12 701/33.4 |
| 2010/0114633 A1* | 5/2010 | Sislak | G06Q 10/047 701/120 |
| 2010/0118025 A1* | 5/2010 | Smith | G06Q 30/02 345/418 |
| 2011/0119374 A1* | 5/2011 | Ruhl | G06Q 10/06 709/224 |
| 2011/0291860 A1* | 12/2011 | Ozaki | G01C 21/3694 340/905 |
| 2013/0325244 A1* | 12/2013 | Wang | G05D 1/028 701/26 |
| 2014/0250529 A1* | 9/2014 | Moeller | H04W 4/029 726/23 |
| 2014/0250530 A1* | 9/2014 | Moeller | H04W 4/029 726/23 |
| 2014/0250531 A1* | 9/2014 | Moeller | H04W 4/029 726/23 |
| 2014/0337976 A1* | 11/2014 | Moeller | H04L 63/1425 726/23 |
| 2015/0057875 A1* | 2/2015 | McGinnis | G05B 19/418 701/31.6 |
| 2015/0185034 A1* | 7/2015 | Abhyanker | G01C 21/36 701/23 |
| 2015/0331422 A1* | 11/2015 | Hartung | G05D 1/021 701/23 |
| 2015/0346727 A1* | 12/2015 | Ramanujam | B62D 15/0285 701/23 |
| 2016/0042239 A1* | 2/2016 | Fowe | G06T 7/20 382/104 |
| 2016/0078759 A1* | 3/2016 | Nerayoff | G06Q 20/145 701/3 |
| 2016/0091321 A1* | 3/2016 | Chintakindi | G01C 21/26 701/117 |
| 2016/0232790 A1* | 8/2016 | Massey | B60W 30/08 |
| 2016/0252354 A1* | 9/2016 | Georgy | G01C 21/165 701/500 |
| 2016/0285863 A1* | 9/2016 | Canavor | H04L 63/0823 |
| 2017/0068484 A1* | 3/2017 | Scott | G06Q 30/0202 |
| 2017/0078221 A1* | 3/2017 | Ding | H04L 47/823 |
| 2017/0124781 A1* | 5/2017 | Douillard | G01S 15/931 |
| 2017/0213459 A1* | 7/2017 | Ogaz | G01S 5/22 |
| 2017/0242079 A1* | 8/2017 | Duan | B60L 11/1861 |
| 2017/0251163 A1* | 8/2017 | Ochiai | H04N 5/232 |
| 2017/0331670 A1* | 11/2017 | Parkvall | H04W 52/0274 |

* cited by examiner

METHOD AND APPARATUS FOR ACQUIRING DATA IN A ROBOT OPERATING SYSTEM

CROSS REFERENCE TO RELATED APPLICATION

This application claims the priority of Chinese Patent Application No. 201610816419.3, entitled "Method and Apparatus for Acquiring Data in a Robot Operating System," filed on Sep. 12, 2016, the content of which is incorporated herein by reference in its entirety.

TECHNICAL FIELD

This disclosure generally relates to the field of data processing technology, particularly to the field of information storage technology, and more particularly to a method and apparatus for acquiring data in a robot operating system.

BACKGROUND

Automobiles extend people's travel range, provide travel convenience to people and improve people's quality of life. With the development and progress of science and technology, driverless vehicles controlled by intelligent systems have become an important trend in future automobile development because they can acquire more driving information than manned vehicles and have higher security. Driverless vehicles use a robot operating system to perform information transmission, and rely on the collaboration of an artificial intelligence module, a visual computing module, a video camera module, a radar sensor module, a laser radar module, and a Global Positioning System (GPS) module, so that the driverless vehicles can automatically and safely travel with no assistance.

However, there remain some insufficiencies in data processing in the existing driverless vehicle. In the existing driverless vehicle, data are typically relayed through the robot operating system, and a location system of the driverless vehicle obtains a location coordinate conversion relationship of the driverless vehicle through various sensors. However, during control process of the driverless vehicle, calculating the current location of the driverless vehicle based on the location coordination conversion relationship is complex, and the information obtained based on the location coordination conversion relationship is limited and simple. In addition, if the data obtained based on the location information are imprecise or false, then the driverless vehicle will judge improperly, thus impeding the driverless vehicle from being accurately controlled.

SUMMARY

This disclosure provides a method and apparatus for acquiring data in a robot operating system so as to address the technical problem mentioned in the foregoing Background section.

In a first aspect, an embodiment of this disclosure provides a method for acquiring data in a robot operating system, the method comprising: monitoring in real time a data storage area of an information acquirer, the information acquirer configured to acquire location state data of a driverless vehicle; obtaining updated data if the updated data are present in the data storage area; and storing the updated data into a data buffer corresponding to the information acquirer.

In some embodiments, the monitoring in real time the data storage area of the information acquirer comprises: monitoring in real time the data storage area by subscribing to and/or releasing a topic of a robot operating system.

In some embodiments, the obtaining the updated data if the updated data are present in the data storage area comprises: checking a temporal tag of the updated data, if there are updated data in the data storage area, and obtaining the updated data, if a time difference between a time point corresponding to the temporal tag and a current time point is below a preset threshold.

In some embodiments, the storing the updated data into the data buffer corresponding to the information acquirer comprises: storing the updated data into the data buffer area corresponding to the information acquirer in an acquisition order; and recording the temporal tag of the updated data into a temporal window, the temporal window configured to define data stored in the data buffer area based on the temporal tag.

In some embodiments, the recording the temporal tag of the updated data into the temporal window comprises: placing the temporal tag at a first place in a temporal tag sequence of the temporal window in a reception order.

In some embodiments, the storing the updated data into the data buffer corresponding to the information acquirer further comprises: deleting in the temporal tag sequence a temporal tag having a time difference between a time point corresponding to the temporal tag and a time point corresponding to the temporal tag at the first place above a preset temporal threshold, and deleting in the data buffer area data corresponding to the temporal tag.

In a second aspect, an embodiment of this disclosure provides an apparatus for acquiring data in a robot operating system, the apparatus comprising: a monitoring unit configured to monitor in real time a data storage area of an information acquirer, the information acquirer configured to acquire location state data of a driverless vehicle; an updated data obtaining unit configured to obtain updated data if the updated data are present in the data storage area; and a storing unit configured to store the updated data into a data buffer corresponding to the information acquirer.

In some embodiments, the monitoring unit comprises: a monitoring sub-unit configured to monitor in real time the data storage area by subscribing to and/or releasing a topic of a robot operating system.

In some embodiments, the updated data obtaining unit comprising: a temporal tag checking sub-unit configured to check a temporal tag of the updated data, if there are updated data in the data storage area, and to obtain the updated data, if a time difference between a time point corresponding to the temporal tag and a current time point is below a preset threshold.

In some embodiments, the storing unit comprises: a storing sub-unit configured to store the updated data into the data buffer area corresponding to the information acquirer in an acquisition order; and a temporal tag storing sub-unit configured to record the temporal tag of the updated data into a temporal window, the temporal window configured to define data stored in the data buffer area based on the temporal tag.

In some embodiments, the temporal tag storing sub-unit comprises: a position setting module configured to place the temporal tag at a first place in a temporal tag sequence of the temporal window in a reception order.

In some embodiments, the storing unit further comprises: a data deleting sub-unit configured to delete in the temporal tag sequence a temporal tag having a time difference between a time point corresponding to the temporal tag and a time point corresponding to the temporal tag at the first place above a preset temporal threshold, and delete in the data buffer area data corresponding to the temporal tag.

In the method and apparatus for acquiring data in a robot operating system according to the embodiments of this disclosure, if updated data of at least one information acquirer are detected, then the updated data will be stored into the data buffer area corresponding to the information acquirer to thereby maximally reserve updated data of the individual information acquirers so as to improve the robustness of the data.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
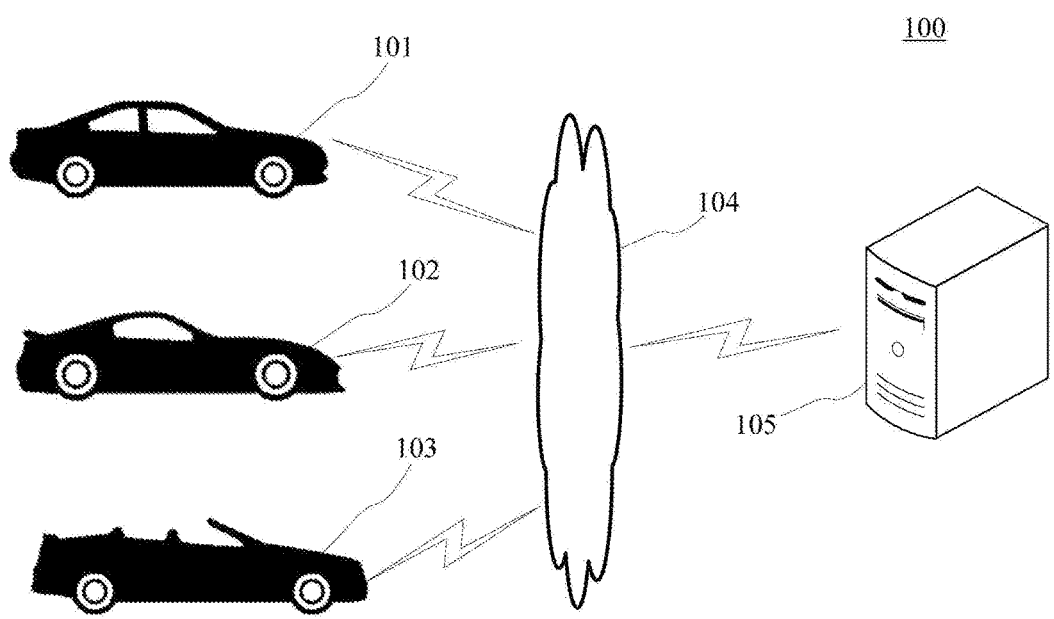
FIG. 1 is an architectural diagram of an exemplary system in which this disclosure may be implemented.

FIG. 1 illustrates an exemplary system architecture 100 in which an embodiment of a method for acquiring data in a robot operating system, or of an apparatus for acquiring data in a robot operating system according to this disclosure may be implemented.

As illustrated in FIG. 1, the system architecture 100 may include driverless vehicles 101, 102, and 103, a network 104, and a server 105. The network 104 serves as a medium providing a communication link between the driverless vehicles 101, 102, and 103, and the server 105. The network 104 may include various types of connections, e.g., a wired or wireless communication link, or an optic fiber cable.

The driverless vehicles 101, 102, and 103 interact with the server 105 over the network 104 to receive or transmit a message, etc. Various data processing applications, e.g., a location information application, a speed control application, a radar ranging application, a temperature control application, and a communication application, may be installed on the driverless vehicles 101, 102, and 103.

The driverless vehicles 101, 102, and 103 may be various vehicles with display screens and program debugging functions, which include, but not limited to, an electric vehicle, a hybrid oil and electric vehicle, and an internal-combustion engine vehicle.

The server 105 may be a server configured to acquire location state data of the driverless vehicles 101, 102, and 103, e.g., a server configured to acquire parameters measured by various sensors on the driverless vehicles 101, 102, and 103. The server 105 may acquire location state data measured by various sensors, and store the acquired location state data into data storage areas of the corresponding sensors for required data processing in the driverless vehicles 101, 102, and 103.

It should be noted that the method for acquiring data in a robot operating system according to the embodiment of the invention may be performed separately by the driverless vehicles 101, 102, and 103, or jointly by the driverless vehicles 101, 102, and 103, and the server 105. Generally, the method for acquiring data in a robot operating system is performed by the driverless vehicles 101, 102, and 103. Accordingly, an apparatus for acquiring data in a robot operating system may be provided in the driverless vehicles 101, 102, and 103, or may be provided in the server 105.

It should be appreciated that the numbers of driverless vehicles, networks, and servers in FIG. 1 are merely illustrative. There may be any number of driverless vehicles, networks, and servers based on actual requirements.

Figure 2:
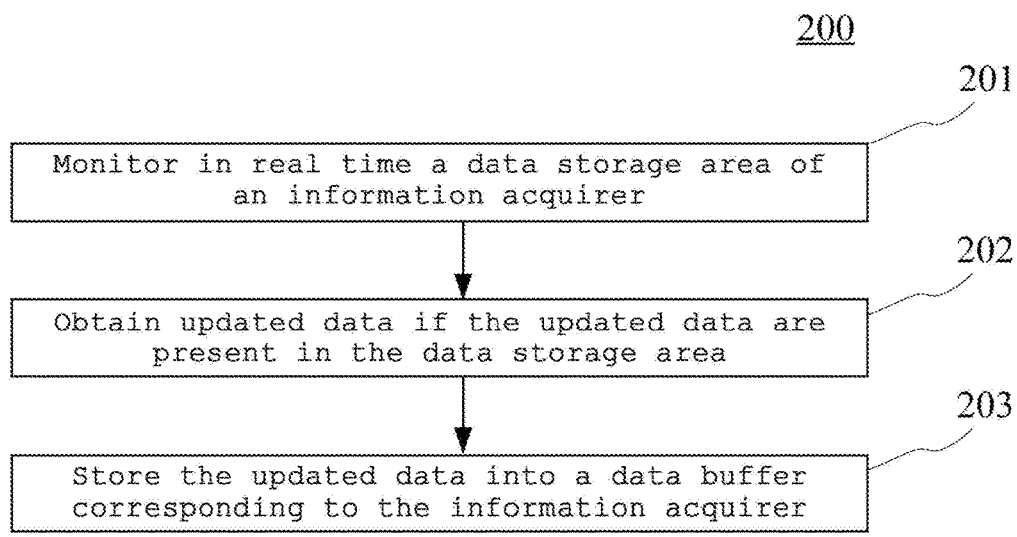
FIG. 2 is a flow chart of a method for acquiring data in a robot operating system according to an embodiment of this disclosure.

FIG. 2 illustrates a flow chart 200 of a method for acquiring data in a robot operating system according to an embodiment of this disclosure. The method for acquiring data in the robot operating system includes the following steps:

Step 201, monitor in real time a data storage area of at least one information acquirer.

The information acquirer is configured to acquire location state data of a driverless vehicle.

In this embodiment, an electronic device on which the method for acquiring data in the robot operating system runs (e.g., the driverless vehicle or the server as illustrated in FIG. 1) may obtain the location state data of the driverless vehicle by way of a wire or wireless connection, where the location information may include various location data acquired by various sensors, e.g., location data acquired through a GPS, location data acquired through an inertial navigation system, and location data acquired through a radar.

The driverless vehicle can travel autonomously without relying on a driver. To implement driverless driving, enough and sufficiently precise environment information of the driverless vehicle needs to be obtained, where the environment information includes location information of the driverless vehicle, speed information of the driverless vehicle, temperature information of a surrounding environment of the driverless vehicle, or temperature information of some component of the driverless vehicle, etc., and since all the location information, the speed information, and the temperature information is related to the location of the driverless vehicle, all the information belongs to the location state data. The location state data is of great importance for the driverless vehicle to make a proper decision, and the accurate and valid location state data can enable the driverless vehicle to issue a reasonable control instruction, and also ensure in effect the driverless vehicle to safely drive. Thus, it is a crucial step in driverless driving to obtain the accurate and valid location state data of the driverless vehicle.

The location state data includes several types, e.g., absolute location state data of the driverless vehicle relative to the ground, and relative location state data of the driverless vehicle relative to another vehicle. Accordingly, the sensor acquiring the location state data (i.e., the information acquirer) also includes two types, i.e. a sensor configured to acquire the absolute location state data (e.g., the GPS), and a sensor configured to acquire the relative location state data (the ranging radar or a ranging laser). These sensors may include data storage areas in which the measured location state data is stored; and if there are no data storage areas in the sensors, then the measured location state data may alternatively be stored in an externally connected data memory. In practice, there are typically a number of sensors installed in the driverless vehicle, and a timely and accurate control instruction will not be issued until the latest data acquired by the sensors are accessed by another application in the driverless vehicle, so that the data storage area of each sensor needs to be monitored to determine whether the latest location state data is acquired by the sensor.

In some optional implementations of this embodiment, monitoring the data storage area of the at least one information acquirer comprises monitoring in real time the data storage area of the at least one information acquirer by subscribing to and/or releasing a topic of a robot operating system.

The information acquirer (i.e., the sensor above) may acquire in real time the location state data corresponding to the acquisition time point, that is, some location state data has a correlation with some time point. For example, if temporal information corresponding to some location state data is 20160501122930250, then the location state data was acquired at 12:29:30.25 on May 1, 2016. The location state data is time-effective, that is, only the latest acquired location state data can be accessed by another application, so that an accurate control instruction may be obtained. If some location state data are read, then effectiveness of the location state data will be reduced. To this end, it may be checked whether the location state data in the data storage area have been read, and if so, then the location state data will be labeled as historical information; otherwise, the location state data will be labeled as updated data, that is, an information monitoring node may monitor in real time whether updated data is present in the information acquirer, wherein the above-mentioned information acquirer may be monitored in real time as mentioned above by subscribing to and/or releasing a topic of a robot operating system, so as to monitor the location state data.

Step 202, obtain updated data if the updated data are present in the data storage area.

If the information monitoring node monitors updated data in the data storage area, then the information monitoring node will signal the data acquiring device to notify the data acquiring device of the availability of the updated data. The data acquiring device obtains the corresponding updated data based on the information from the information monitoring node.

In some optional implementations of this embodiment, if there are updated data in the data storage area, obtaining updated data may include: if there are updated data in the data storage area, then a temporal tag of the updated data will be checked, and if a time difference between a time point corresponding to the temporal tag and a current time point is below a preset threshold, then the updated data will be obtained.

As can be understood from the description above, there is a temporal tag corresponding to the location state data (i.e., the temporal information above). The temporal tag indicates the time point when the location state data are obtained. A smaller temporal difference between the time point corresponding to the temporal tag and the current time point indicates that the location state data is more valid. Processing components in the driverless vehicle, which need the location state data, require the location state data to be valid for different periods of time. Typically, the location state data with such a temporal tag that the time difference between the time point corresponding to the temporal tag and the current time point is below the preset threshold may be labeled as valid updated data, and the updated data is obtained.

Step 203, store the updated data into a data buffer corresponding to the information acquirer.

The information acquirer may be a GPS, an inertial navigation system, or other sensor, wherein the data formats of the location state data acquired by these sensors are typically different. A data processing unit of the driverless vehicle needs to control parameters, such as the speed, the angle, the location, etc., of the vehicle based on the location state data. Different data processing units also need different location state data. For different data processing units, the location state data in some data formats may be used directly for processing data, and the location state data in some data formats need to be converted. Data conversion, however, consumes both time and the data processing capacity, and has an influence upon the precision of the processed location state data, and thus a direct influence upon the effect of controlling the driverless vehicle. To this end, in this disclosure, the updated data of different information acquirers are stored into data buffer areas corresponding to the information acquirers, so that the data processing units may obtain corresponding location state data as needed to improve the speed of data processing, and speed up the obtainment of the control instruction so as to facilitate timely and accurate control on the vehicle. Moreover the various location state data are called by a plurality of data processing units to thereby avoid a piece of location state data from being called by the plurality of data processing units, which would result in a low reading speed, and other problems; and if some location state data are less accurate, then the data processing units may perform data processing through other location state data to thereby improve the robustness of data processing.

In some optional implementations of this embodiment, storing the updated data into the data buffer area corresponding to the information acquirer may include the following steps:

Firstly the updated data are stored into the data buffer area corresponding to the information acquirer in the reception order.

There is a data buffer area corresponding to each information acquirer. The data in the data buffer area includes not only newly acquired updated data, but also previously acquired updated data, so that some data processing units analyze the temporal variation of the data. Typically, the updated data are stored in the data buffer area in the order that the updated data are received by the data acquiring device.

Secondly the temporal tags of the updated data are recorded into a temporal window configured to define the data stored in the data buffer area according to the temporal tags.

Updated data are received continuously in the data buffer area, and stored sequentially in the data buffer area in the reception order. For some data processing units, only the updated data within certain temporal range can be accessed, and in this embodiment, the validity of the updated data may be monitored using the temporal window. The temporal tags of the updated data may be recorded in the temporal window, and some temporal range can be defined, so that the temporal tags in the temporal range of the temporal window are valid temporal tags, and the updated data corresponding to these temporal tags are valid updated data, that is, the temporal window enables the data stored in the data buffer area to be defined based on the temporal tags.

In some optional implementations of this embodiment, recording the temporal tags of the updated data into the temporal window may include placing the temporal tags at the first place in the temporal tag sequence of the temporal window in the reception order.

There are a number of temporal tags in the temporal window, and these temporal tags are put into the temporal tag sequence in the reception order, in the same way as the updated data put into the data buffer area, that is, each newly received temporal tag is put at the first place in the temporal tag sequence, so that the other temporal tags are sequentially moved backward, and in this way, the temporal tags in the temporal tag sequence are arranged chronologically based on the order that the temporal tags are received.

In some optional implementations of this embodiment, storing the updated data into the data buffer area corresponding to the information acquirer as mentioned above may further include: deleting in the above-mentioned temporal tag sequence a temporal tag having a time difference between a time point corresponding to the temporal tag and a time point corresponding to the temporal tag at the first place above a preset temporal threshold, and deleting in the data buffer area data corresponding to the temporal tag.

The temporal range of the temporal window is configured to define the validity of the updated data corresponding to the temporal tag, and if there is a temporal tag in the temporal tag sequence having a time difference between a time point corresponding to the temporal tag and a time point corresponding to the temporal tag at the first place above the preset temporal threshold, then the updated data corresponding to the temporal tag will be considered invalid, and the temporal tag, and the updated data corresponding to the temporal tag may be deleted.

Figure 3:
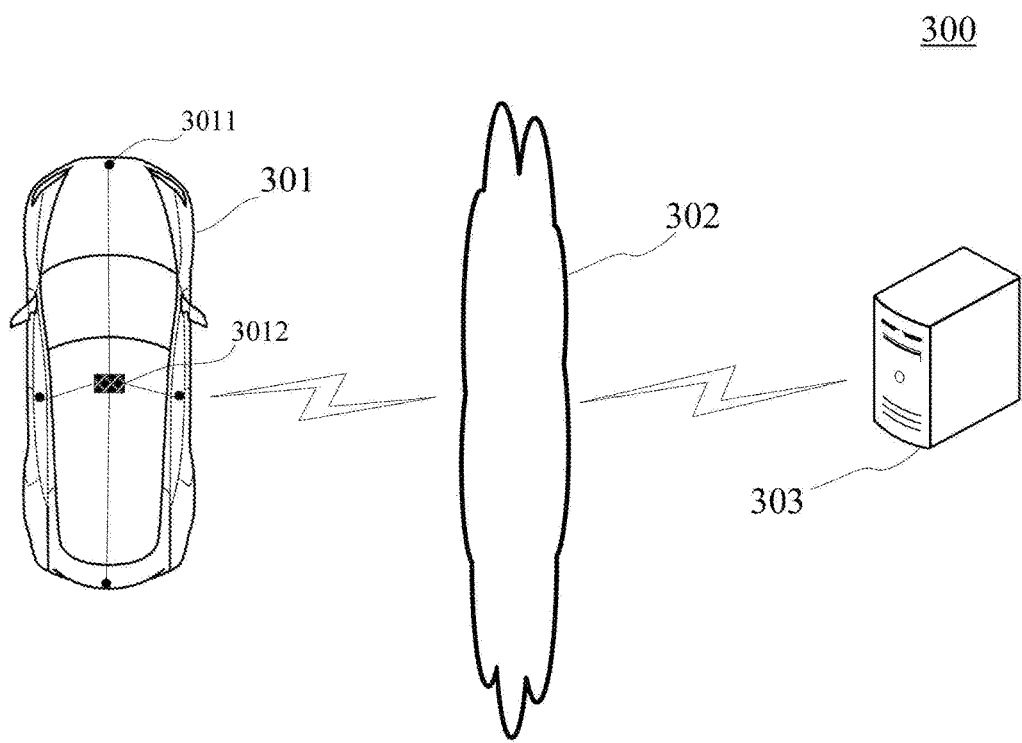
FIG. 3 is a schematic diagram of an application scenario of a method for acquiring data in a robot operating system according to an embodiment of this disclosure.

Further reference will be made to FIG. 3 which is a schematic diagram of an application scenario of a method for acquiring data in a robot operating system according to this embodiment. As can be seen from FIG. 3, there are numerous information acquirers 3011 installed on a driverless vehicle 301, wherein the information acquirers 3011 are positioned at different locations throughout the driverless vehicle 301, and may acquire various different or identical location state data. If the driverless vehicle 301 is traveling, then individual information acquirers 3011 will acquire location state data of the driverless vehicle 301. A data processing unit 3012 will obtain in real time updated data of the information acquirers 3011, wherein the updated data may be used to control the driverless vehicle 301, may can be further transmitted to a server 303 to track the driverless vehicle 301, or to be used for other data processing; and if the driverless vehicle 301 is resting, then some information acquirers 3011, e.g., a GPS, will stand by, and some information acquirers 3011, e.g., a ranging radar, will still be operating, so that each information acquirer 3011 will be checked for updated data, and if there are updated data, then the updated data will be obtained.

In the method for acquiring data in the robot operating system according to the embodiments of this disclosure, if updated data of at least one information acquirer are detected, then the updated data will be stored into the data buffer area corresponding to the information acquirer to thereby maximally reserve updated data of the individual information acquirers so as to improve the robustness of the data.

Figure 4:
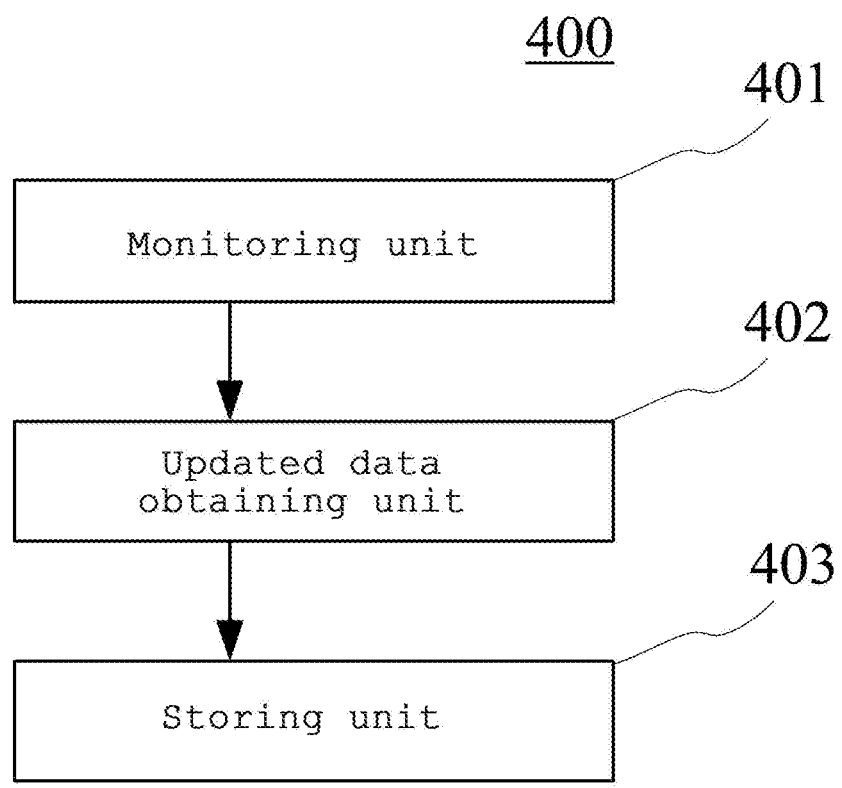
FIG. 4 is a schematic structural diagram of an apparatus for acquiring data in a robot operating system according to an embodiment of this disclosure.

Further referring to FIG. 4, as an implementation of the method illustrated in the above-mentioned figures, an embodiment of this disclosure provides an apparatus for acquiring data in a robot operating system. The embodiment of the apparatus corresponds to the embodiment of the method as illustrated in FIG. 2. The apparatus can be specifically applied to various electronic devices.

As illustrated in FIG. 4, the above-mentioned apparatus 400 for acquiring data in the robot operating system according to this embodiment may include a monitoring unit 401, an updated data obtaining unit 402, and a storing unit 403, wherein the monitoring unit 401 is configured to monitor in real time a data storage area of at least one information acquirer configured to acquire location state data of a driverless vehicle; the updated data obtaining unit 402 is configured to obtain updated data if the updated data are present in the data storage area; and the storing unit 403 is configured to store the updated data into a data buffer corresponding to the information acquirer.

In some optional implementations of this embodiment, the above-mentioned monitoring unit includes a monitoring sub-unit configured to monitor in real time the data storage area by subscribing to and/or releasing a topic of a robot operating system.

In some optional implementations of this embodiment, the above-mentioned updated data obtaining unit 402 may include a temporal tag checking sub-unit (not shown) configured to check a temporal tag of the updated data if there are updated data in the data storage area, and to obtain the updated data if the time difference between an time point corresponding to the temporal tag and the current time point is below a preset threshold.

In some optional implementations of this embodiment, the above-mentioned storing unit 403 may include a storing sub-unit (not shown) and a temporal tag storing sub-unit (not illustrated), wherein the storing sub-unit is configured to store the updated data into the data buffer area corresponding to the information acquirer in the reception order; and the temporal tag storing sub-unit is configured to record the temporal tag of the updated data into a temporal window configured to define data stored in the data buffer area based on the temporal tag.

In some optional implementations of this embodiment, the above-mentioned temporal tag storing sub-unit may include a location setting module (not shown) configured to place the temporal tag at the first place in a temporal tag sequence of the temporal window in the reception order.

In some optional implementations of this embodiment, the above-mentioned storing unit 403 may further include a data deleting sub-unit (not shown) configured to delete in the above-mentioned temporal tag sequence a temporal tag having a time difference between a time point corresponding to the temporal tag and a time point corresponding to the temporal tag at the first place above a preset temporal threshold, and delete in the data buffer area data corresponding to the temporal tag.

Figure 5:
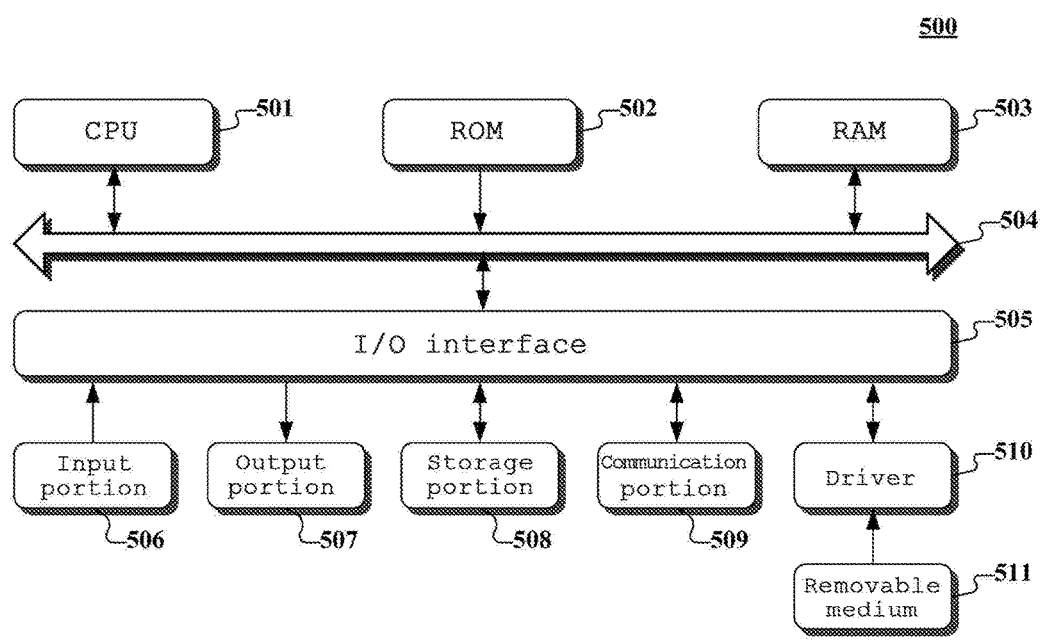
FIG. 5 is a schematic structural diagram of a server according to an embodiment of this disclosure.

Referring to FIG. 5, a schematic structural diagram of a computer system 500 adapted to implement a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow charts may be implemented in a computer software program.

For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 509, and/or may be installed from the removable media 511.

The flow charts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented byway of software or hardware. The described units may also be provided in a processor, for example, described as: a processor, comprising a monitoring unit, an updated data obtaining unit and a storing unit, where the names of these units or modules are not considered as a limitation to the units or modules. For example, the storing unit may also be described as "a unit for storing updated data".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs, when executed by a device, cause the device to: monitor in real time a data storage area of an information acquirer, the information acquirer configured to acquire location state data of a driverless vehicle; obtain updated data if the updated data are present in the data storage area; and store the updated data into a data buffer corresponding to the information acquirer.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for acquiring data in a robot operating system, the method comprising:
   monitoring in real time a data storage area of an information acquirer, the information acquirer configured to acquire location state data of a driverless vehicle;
   obtaining updated data if the updated data are present in the data storage area; and
   storing the updated data into a data buffer corresponding to the information acquirer,
   wherein obtaining the updated data if the updated data are present in the data storage area comprises:
      checking a temporal tag of the updated data, if there are updated data in the data storage area, and
      obtaining the updated data, if a time difference between a time point corresponding to the temporal tag and a current time point is below a preset threshold.

2. The method according to claim 1, wherein the storing the updated data into the data buffer corresponding to the information acquirer comprises:
   storing the updated data into the data buffer area corresponding to the information acquirer in an acquisition order; and
   recording the temporal tag of the updated data into a temporal window, the temporal window configured to define data stored in the data buffer area based on the temporal tag.

3. The method according to claim 2, wherein the recording the temporal tag of the updated data into the temporal window comprises:
   placing the temporal tag at a first place in a temporal tag sequence of the temporal window in a reception order.

4. The method according to claim 3, wherein the storing the updated data into the data buffer corresponding to the information acquirer further comprises:
   deleting in the temporal tag sequence a temporal tag having a time difference between a time point corresponding to the temporal tag and a time point corresponding to the temporal tag at the first place above a preset temporal threshold, and deleting in the data buffer area data corresponding to the temporal tag.

5. An apparatus for acquiring data in a robot operating system, the apparatus comprising:
- a monitoring unit configured to monitor in real time a data storage area of an information acquirer, the information acquirer configured to acquire location state data of a driverless vehicle;
- an updated data obtaining unit configured to obtain updated data if the updated data are present in the data storage area; and
- a storing unit configured to store the updated data into a data buffer corresponding to the information acquirer,
- wherein the updated data obtaining unit comprises:
    - a temporal tag checking sub-unit configured to check a temporal tag of the updated data, if there are updated data in the data storage area, and to obtain the updated data, if a time difference between a time point corresponding to the temporal tag and a current time point is below a preset threshold.

6. The apparatus according to claim 5, wherein the storing unit comprises:
- a storing sub-unit configured to store the updated data into the data buffer area corresponding to the information acquirer in an acquisition order; and
- a temporal tag storing sub-unit configured to record the temporal tag of the updated data into a temporal window, the temporal window configured to define data stored in the data buffer area based on the temporal tag.

7. The apparatus according to claim 6, wherein the temporal tag storing sub-unit comprises:
- a position setting module configured to place the temporal tag at a first place in a temporal tag sequence of the temporal window in a reception order.

8. The apparatus according to claim 7, wherein the storing unit further comprises:
- a data deleting sub-unit configured to delete in the temporal tag sequence a temporal tag having a time difference between a time point corresponding to the temporal tag and a time point corresponding to the temporal tag at the first place above a preset temporal threshold, and delete in the data buffer area data corresponding to the temporal tag.

9. A non-transitory storage medium storing one or more programs, the one or more programs when executed by a device, causing the device to perform a method for acquiring data in a robot operating system, the method comprising:
- monitoring in real time a data storage area of an information acquirer, the information acquirer configured to acquire location state data of a driverless vehicle;
- obtaining updated data if the updated data are present in the data storage area; and
- storing the updated data into a data buffer corresponding to the information acquirer,
- wherein the obtaining the updated data if the updated data are present in the data storage area comprises:
- checking a temporal tag of the updated data, if there are updated data in the data storage area, and
- obtaining the updated data, if a time difference between a time point corresponding to the temporal tag and a current time point is below a preset threshold.

\* \* \* \* \*